United States Patent
Connell et al.

[11] Patent Number: 5,918,460
[45] Date of Patent: Jul. 6, 1999

[54] LIQUID OXYGEN GASIFYING SYSTEM FOR ROCKET ENGINES

[75] Inventors: Donald R. Connell, Jupiter; Jeremy P. B. Cuffe, Stuart, both of Fla.

[73] Assignee: United Technologies Corporation, Hartford, Conn.

[21] Appl. No.: 08/850,259

[22] Filed: May 5, 1997

(Under 37 CFR 1.47)

[51] Int. Cl.$^6$ .................................. F02K 9/48; F02K 9/46
[52] U.S. Cl. ................................ 60/257; 60/267; 60/260; 60/259
[58] Field of Search ............................. 60/257, 259, 260, 60/266, 267, 730, 736

[56] References Cited

U.S. PATENT DOCUMENTS

| | | | |
|---|---|---|---|
| 2,930,187 | 3/1960 | Chillson et al. | 60/259 |
| 3,077,073 | 2/1963 | Kuhrt | 60/266 |
| 3,516,254 | 6/1970 | Hammond | 60/260 |
| 4,583,362 | 4/1986 | Wagner | 60/259 |
| 4,589,253 | 5/1986 | Wagner | 60/259 |
| 4,825,650 | 5/1989 | Hosford | 60/267 |
| 4,899,536 | 2/1990 | Vershure | 60/730 |
| 5,410,874 | 5/1995 | Limerick | 60/267 |
| 5,551,230 | 9/1996 | Meng | 60/259 |

FOREIGN PATENT DOCUMENTS

| | | | |
|---|---|---|---|
| 3506826 | 8/1986 | Germany | 60/260 |

*Primary Examiner*—Ted Kim
*Attorney, Agent, or Firm*—Norman Friedland

[57] ABSTRACT

For a liquid rocket engine including the SSME the gaseous heat exchanger that is in the liquid oxygen turbopump exit flow path that serves to gasify the liquid oxygen for pressurizing the liquid oxygen tank and the POGO is modified by changing the flow circuit to replace the liquid oxygen with high pressure hydrogen tapped off of the low pressure fuel turbopump so that hydrogen/hydrogen at a favorable pressure differential is in indirect heat relation for providing a safe environment and avoiding what may result in a catastrophic failure in the event the heat exchanger fails. An external heat exchanger in communication with the heat exchanger in the liquid oxygen turbopump is provided to gasify the liquid oxygen for the pressurizing purposes.

7 Claims, 2 Drawing Sheets

LIQUID OXYGEN GASIFYING SYSTEM FOR ROCKET ENGINES

This invention was made under a United States Government contract and the United States Government has an interest herein.

TECHNICAL FIELD

This invention relates to rocket engines of the type that can be utilized for powering a launch vehicle and particularly to means for gasifying the liquid oxygen in a safe manner to avoid a catastrophic incident occasioned when unfriendly high temperature gaseous hydrogen and gaseous oxygen are combined.

BACKGROUND ART

The main rocket engine for the existing Space Shuttle vehicle (SSME) includes in its fuel systems in certain versions a gaseous oxygen heat exchanger in the liquid oxygen turbopump turbine exit flow path. The purpose of this heat exchanger is to heat a portion of the liquid oxygen to its gaseous state so that it can be utilized to pressurize the oxygen tank and the POGO (a stabilizing system in the SSME liquid oxygen inlet line). The energy to heat the oxygen is taken from preburner combustion gas as this hot gas exists from the turbine of the liquid oxygen turbopump. The hot gas is routed to surround the coils of the heat exchanger that is mounted in the LOX turbopump turbine housing. The hot gas which is extremely hydrogen rich, surrounds these heat exchanger coils and is at a much higher pressure than the pressure of the oxygen within the coils. Obviously, if a rupture of the coils should occur the higher pressure hot hydrogen will enter the heat exchanger and flow to the oxygen tank which could ultimately result in the explosion of this tank.

While heat exchangers are typically used in the liquid rocket fuel systems, these heat exchanger are either used to increase the temperature of the oxidizer and/or fuel before being admitted to the combustion chamber's fuel injector or utilized in a regenerative system so as to raise the fuel temperature at the low pressure turbine inlet in order to pump the propellant for engine output power. Examples of such systems are disclosed in U.S. Pat. Nos. 4,589,253 granted to Wagner on May 20, 1986 entitled "Pre-Regenerated Staged-Combustion Rocket Engine", 4,583,362 granted to Wagner on Apr. 22, 1986 entitled "Expander-Cycle, Turbine-Drive, Regenerative Rocket Engine", 5,101,622 granted to Bond on Apr. 7, 1992 entitled "Aerospace Propulsion", 3,049,870 granted to Chamberlain on Aug. 21, 1962 entitled "Rocket Propellant Cycle", 2,930,187 granted to Chillson et al on Mar. 29, 1960 entitled "Variable Thrust Rocket Engine" and 4,771,599 granted to Brown et al on Sep. 20, 1988 entitled "Tripopellant Rocket Engine with Injector", the latter patent being assigned to United Technologies Corporation the assignee common to this patent application.

We have found that we can obtain an efficacious system for a rocket engine for pressurizing the oxygen tank without having to change or modify the existing internal heat exchanger of the SSME by converting the heretofore known gaseous oxygen heat exchanger (GOX/HEX) to a hydrogen heat exchanger ($H_2$/HEX). The source of hydrogen for the converted internal $H_2$/HEX is selected such that the pressure of the hydrogen is higher than the pressure of the hot gas surrounding the heat exchanger coils. Accordingly, the hydrogen would leak out from a fractured coil rather than hot hydrogen-rich gas leaking into the coil.

According to this invention an external heat exchanger is added to indirectly transfer heat from the hot hydrogen to the liquid oxygen to create a gas. This external heat exchanger is a self-contained unit that can easily be added to the existing SSME system. Only minor modifications are necessary to the fluid ducting of the current engine in order to convert the existing internal heat exchanger from oxygen to hydrogen. Of importance is that no control systems are necessary to adapt this invention to the current SSME. All flows are controlled with existing valves and trimmed out using pressure balances and flow restrictions as will be described hereinbelow.

SUMMARY OF THE INVENTION

An object of this invention is to provide an improved system for pressurizing the oxygen tank and/or POGO system which is characterized as having a favorable failure mode as contrasted with heretofore known systems that could lead to catastrophic results given a failure to the system.

A feature of this invention is the use of an external heat exchanger for changing the liquid oxygen to a gaseous state and converting the existing internal liquid oxygen heat exchanger (LOX/HEX) to a $H_2$/HEX.

A feature of this invention is the modification of the existing system for the SSME to improve the failure mode while making only minor changes to the overall system and avoiding changes in the control system.

The foregoing and other features of the present invention will become more apparent from the following description and accompanying drawings.

DETAILED DESCRIPTION OF THE PREFERRED EMBODIMENT

Figure 1:
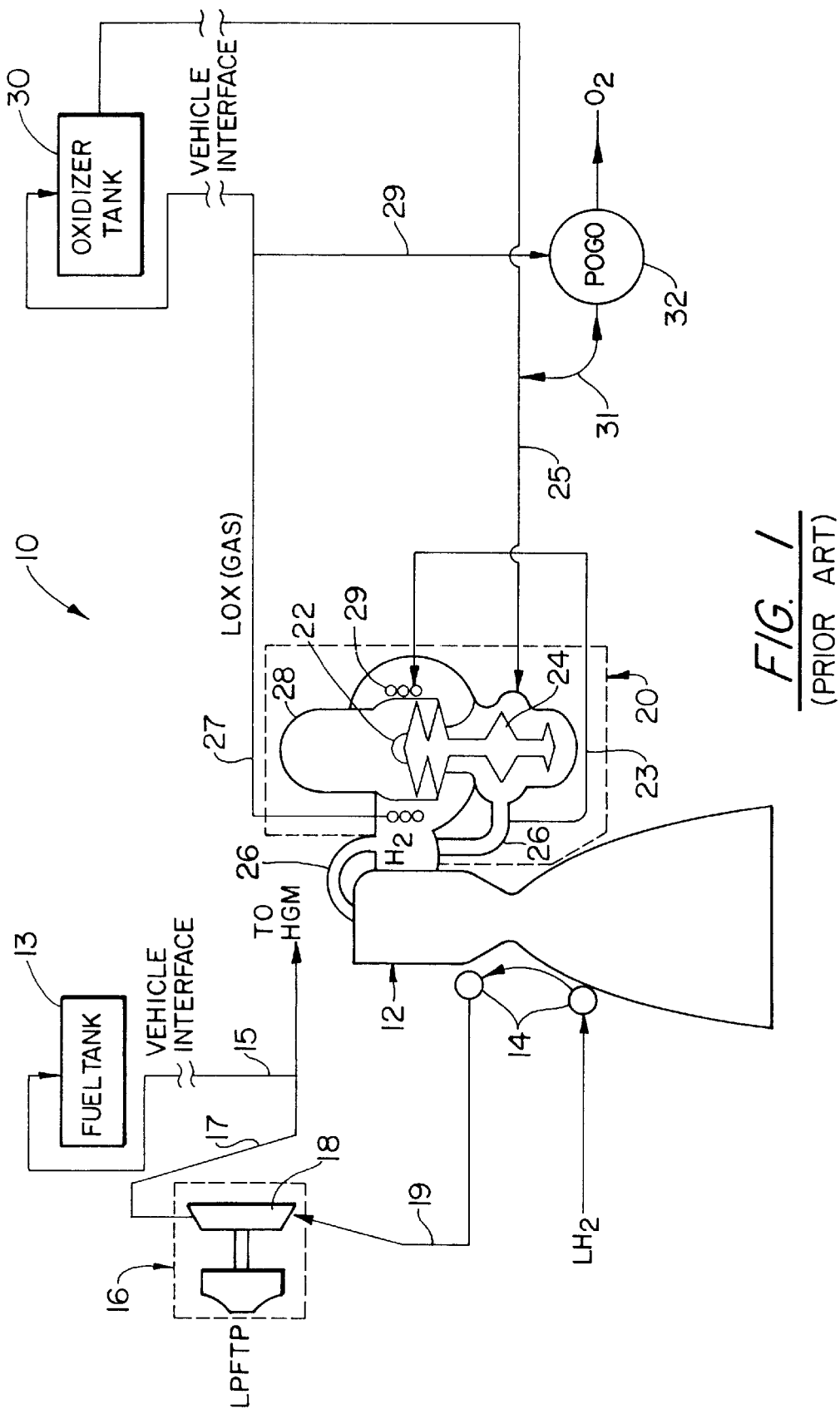
FIG. 1 is a schematic of a portion of the prior art fuel system for pressurizing the oxygen tank and POGO.

While this invention describes the preferred embodiment as utilized on a current SSME designed system, it should be understood that this invention can be utilized in any rocket fuel system which requires pressurization utilizing liquid oxygen and where it is desirable to eliminate the possibility of combining of explosive material in an indirect heat exchanger upon the occurrence of a rupture of the plumbing flowing that material. To best understand this invention, the existing prior art system will be described immediately hereinbelow with reference to FIG. 1.

The rocket engine, only partially shown, and illustrated by reference numeral 10 is comprised of a combustion chamber 12 and chamber passages 14 for flowing liquid hydrogen around the external wall of the combustion chamber in order to maintain the walls of the combustor at a tolerable temperature level and change the state of the liquid hydrogen to a gas. The hydrogen gas is routed to turbine 18 via line 19 which serves to power the turbine 18 of the low pressure fuel turbopump (LPFTP) which is typical in a liquid rocket engine of this type or an expander cycle exemplified by the RL 10 rocket engine manufactured by United Technologies Corporation, the assignee of this patent application. The spent hydrogen exiting from the turbine 18 of the LPFTP 16 issued to or returned to pressurize the fuel tank 13 via branch line 15 and the hot gas manifold (HGM) via line 17.

The high pressure turbopump generally illustrated by reference numeral 20 includes the dual stages of turbine 22 and the pump 24 driven thereby and serves to pump the LOX admitted thereto from the oxygen tank via line 25 into the injector of the rocket engine via line 26. The preburner 28 serves to burn the oxygen and the hydrogen and change it to a hot gaseous state whose energy is used to power turbine 22. The hot gaseous fuel rich turbine discharge is fed into the combustor 12 where it combines with the low temperature oxygen to produce the hot gasses required to generate the power of the rocket engine.

LOX is tapped off of line 26 and flows via line 23 through the coils 29 surrounding the turbines 22 and is utilized to pressurize the oxidizer tank 30 via line 27 and the POGO 32 via branch line 29. Pressure in the POGO is balanced by the loop schematically represented by line 31 where the LOX can flow out of or into the POGO to stabilize any pressure fluctuations. As is apparent from the foregoing the LOX in coils 29 is in indirect heat exchange with the extremely hot hydrogen gasses discharging from the turbine 22 and defines the internal GOX/HEX. Obviously, any leakage in the GOX/HEX resulting from a fracture of the coils 29 will cause the higher pressure hot hydrogen to flow into the lower pressure oxygen which could result in a an unacceptable failure or even a catastrophe in the event the hot hydrogen migrates to the oxidizer tank. This invention serves to eliminate this condition in the system without requiring a major change to the existing system and hardware.

Figure 2:
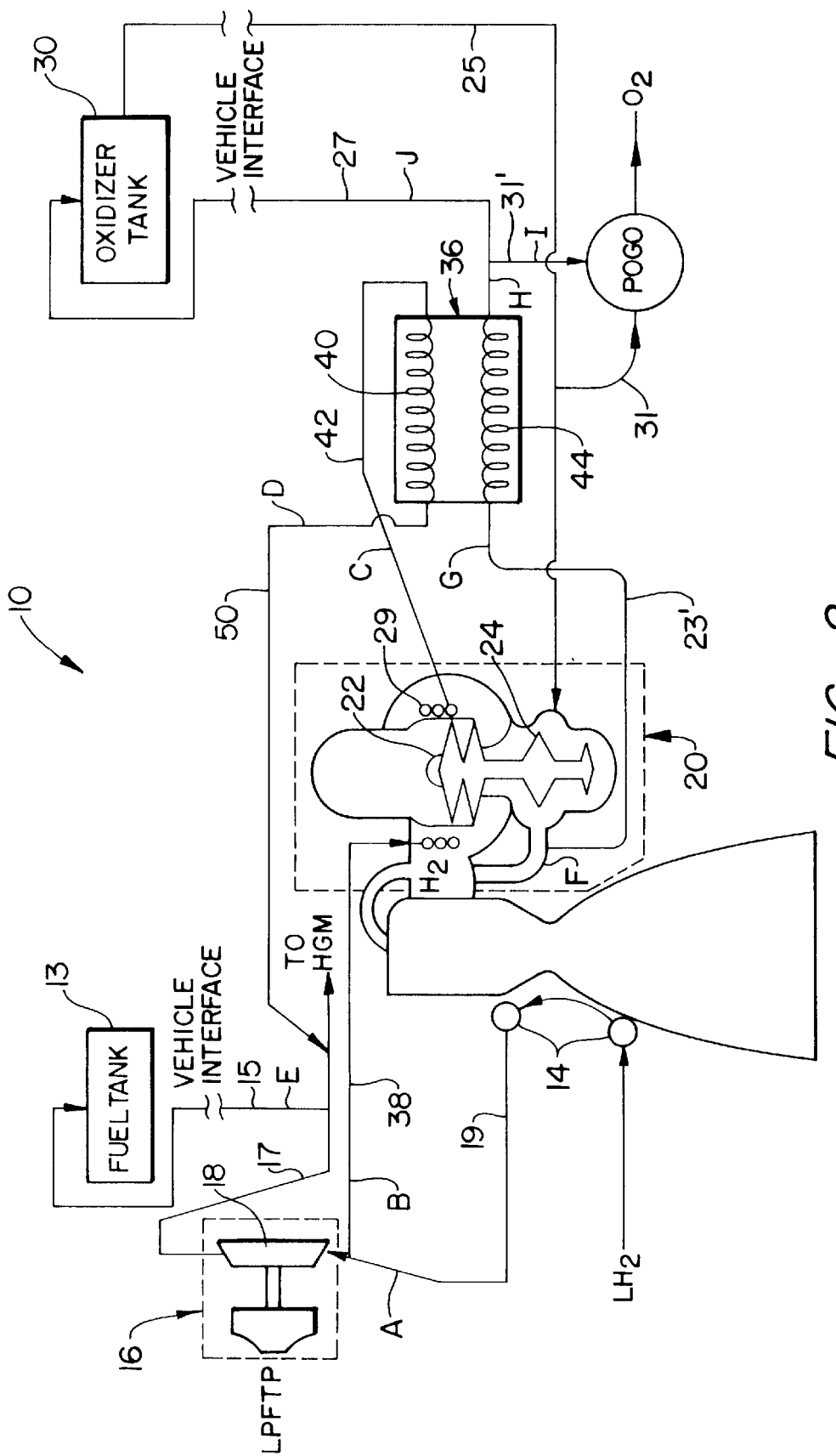
FIG. 2 is a schematic of the system depicted in FIG. 1 modified to incorporate the present invention.

As seen in FIG. 2 an additional heat exchanger generally illustrated by reference numeral 36 is mounted externally of the high pressure turbopump 20 and serves to place the hydrogen taken from the LPFTP loop in indirect heat exchange with the oxygen discharging from pump 24. As will be explained in further detail the GOX/HEX is converted to a hydrogen heat exchanger ($H_2$/HEX). In other words, in the hostile environment of the high pressure turbopump 20 the extremely hot hydrogen is placed in indirect heat exchange with the lower temperature hydrogen and hence, eliminates the potential of extremely hot hydrogen gases leaking into the oxygen tank. (Like reference numerals used in FIGS. 1 and 2 depict the same elements). As noted in this embodiment gaseous hydrogen is tapped off of the chamber passages 14 surrounding the combustion chamber via line 38 upstream of the turbine 18 and admitted into coil 29 that surrounds the turbine 22. This now places the hydrogen in indirect heat exchange with the hot hydrogen discharging from the turbine 22. Thus this heat exchanger which was internal GOX/HEX now becomes a hydrogen HEX. The heated hydrogen in coil 29 flows through coil 40 in the external heat exchanger 36 via line 42 and the line 23' is now rerouted to the other coil 44 in the heat exchanger 36. Heat exchanger 36 now becomes the external GOX/HEX but it is mounted away from the turbopump 20 and its hostile environment. The $H_2$ is returned to the system downstream of the LPFTP turbine 18 via line 50. As a result of this invention the pressure of the hydrogen inside the coil 29 of the $H_2$/Hex is higher than the hot hydrogen rich products surrounding the $H_2$/Hex coil 29. Accordingly, should a rupture occur in the coils or walls of the $H_2$/Hex, hydrogen will leak out of the $H_2$/Hex coils into the hot hydrogen rich turbine discharge and avoid a fire or catastrophic condition or in other words, create a safe environment.

As mentioned hereinabove, the hydrogen is placed in indirect heat exchange in the GOX/HEX with the lower temperature hydrogen. The LOX from the first stage discharge from the LOX pump 24 is utilized in the oxygen circuit. In this circuit the LOX in line 23' is re-routed to bypass the GOX/HEX in the high pressure turbopump to flow to coils 44 where it is heated to a gaseous state to pressurize the oxidizer tank and POGO systems. The hydrogen in coil 40 is discharged via line 50 in the turbine discharge flow line 52 of the turbine 18 of the low pressure fuel turbopump.

To appreciate this invention the flow in pounds per second, the temperature in degrees Rankine and the pressure in pounds per square inch absolute of the fuel flow and oxidizer flow at various stations in their respective flow paths and identified from A–J are shown immediately herein below.

The fuel flow path is as follows:

| LOCATION | FLOW | TEMPERATURE | PRESSURE |
| --- | --- | --- | --- |
| A | 25.7 | 597 | 4120 |
| B | 0.55 | 596 | 3900 |
| C | 0.55 | 930 | 3400 |
| D | 0.55 | 730 | 2950 |
| E | 0.55 | 582 | 2900 |

The oxidizer flow path is as follows:

| LOCATION | FLOW | TEMPERATURE | PRESSURE |
| --- | --- | --- | --- |
| F | 792 | 190 | 3840 |
| G | 1.82 flow path is as follows: .82 | 190 | 3780 |
| H | 1.82 | 850 | 3450 |
| I | 0.27 | 850 | 3400 |
| J | 1.55 | 850 | 3400 |

What has been shown by this invention is a simple system that can be added to the existing SSME system without requiring the addition of controls and valves for obviating the problem that would occur should the hot hydrogen rich products inadvertently come into contact with the oxygen in the internal GOX/HEX in the LOX turbopump exit flow path as shown in FIG. 1.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. A liquid rocket engine that includes liquid oxygen and liquid hydrogen as the combustion agents comprising: a liquid oxygen turbopump including a first heat exchanger located in a turbine exit flow path of said liquid oxygen turbopump, a preburner for combining oxygen and hydrogen and creating a high pressure hydrogen rich gas to power said turbopump, said first heat exchanger being in indirect heat exchange with said high pressure hydrogen rich gas, a low pressure fuel turbopump, fluid connections for flowing low pressure hydrogen from upstream of a turbine of said low pressure fuel turbopump and admitting hydrogen into said turbine, an additional fluid connection for admitting liquid oxygen into a pump of said liquid oxygen turbopump, a by-pass line interconnecting said fluid connections for placing the hydrogen from upstream of said low pressure fuel turbopump in indirect heat exchange with said high pressure hydrogen rich gas in said first heat exchanger, an externally mounted second heat exchanger relative to said first heat exchanger placing the low pressure hydrogen from upstream of said low pressure fuel turbopump and discharging from said first heat exchanger in indirect heat exchange with liquid oxygen, a conduit for leading liquid oxygen to said second heat exchanger for gasifying said liquid oxygen prior to being admitted to said engine, and whereby the potential of using liquid oxygen and hydrogen in said first heat exchanger is avoided, thus providing a safer condition.

2. A liquid rocket engine as claimed in claim 1 wherein said first heat exchanger includes coils surrounding the turbine of said liquid oxygen turbopump.

3. A liquid rocket engine as claimed in claim 2 wherein liquid oxygen discharging from the pump of said liquid oxygen turbopump is placed in indirect heat exchange with the hydrogen in said second heat exchanger.

4. A liquid rocket engine as claimed in claim 3 wherein said second heat exchanger includes coils for flowing hydrogen and second coils for flowing oxygen.

5. A liquid rocket engine as claimed in claim 4 including an oxidizer tank wherein said oxygen in said second coils is gasified and a flow line interconnecting said second coils and said oxidizer tank flows gasified oxygen to pressurize said tank.

6. A liquid rocket engine as claimed in claim 5 including a POGO circuit and a branch line interconnecting said flow line and said POGO circuit to inject gasified oxygen therein.

7. A liquid rocket engine as claimed in claim 6 wherein the hydrogen discharging from coils flows to a discharge of the turbine of said low pressure fuel turbopump.

* * * * *